Figure 1:
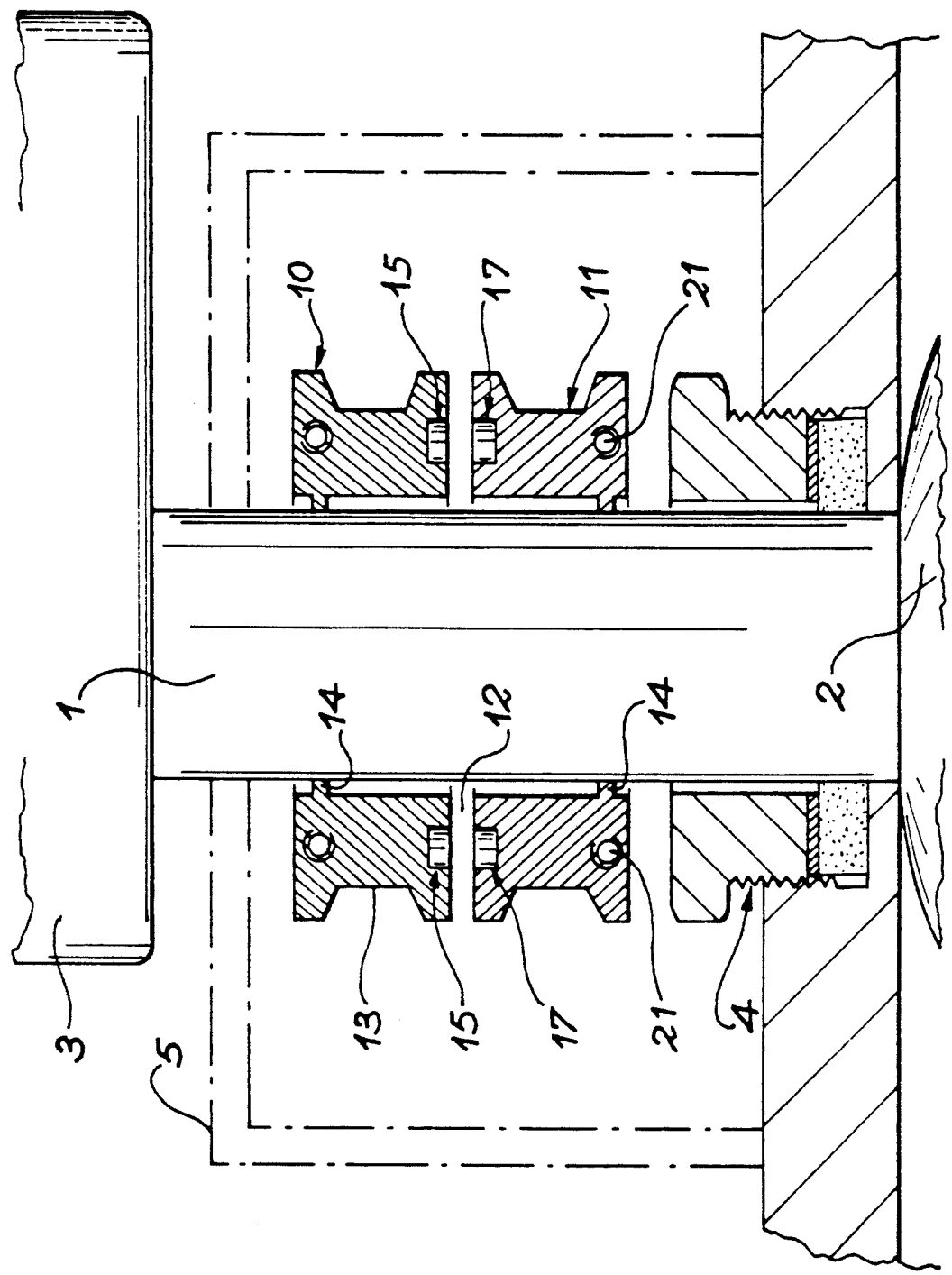

United States Patent [19]

Guillet et al.

[11] Patent Number: 5,327,786
[45] Date of Patent: Jul. 12, 1994

[54] APPARATUS FOR MEASURING AXIAL STRESSES ON A ROD

[75] Inventors: Jacques Guillet, Sartrouville; Jean-Louis Charron, Senlis, both of France

[73] Assignee: Electricite De France (Service National), France

[21] Appl. No.: 849,050

[22] PCT Filed: Sep. 18, 1991

[86] PCT No.: PCT/FR91/00736
§ 371 Date: Apr. 23, 1992
§ 102(e) Date: Apr. 23, 1992

[87] PCT Pub. No.: WO92/05417
PCT Pub. Date: Apr. 2, 1992

[30] Foreign Application Priority Data

Sep. 19, 1990 [FR] France ................. 90 11555

[51] Int. Cl.⁵ .............................................. G01L 1/00
[52] U.S. Cl. ............................................ 73/779; 73/774
[58] Field of Search ......................... 73/774, 777–780, 73/168, 862.49, 862.625, 862.626; 33/783, 787–791; 324/209

[56] References Cited

U.S. PATENT DOCUMENTS

| 2,099,662 | 11/1937 | Slonneger | 33/790 |
| 2,382,351 | 8/1945 | Thorpe | 33/790 |
| 3,151,399 | 10/1964 | MacGeorge | 33/789 |
| 3,402,472 | 9/1968 | Riley | 33/790 |
| 4,251,918 | 2/1981 | Duggan | 33/790 |
| 4,275,599 | 6/1981 | Kohlenberger et al. | 73/774 |
| 4,823,473 | 4/1989 | McMahon | 33/787 |
| 4,930,228 | 6/1990 | Anderson et al. | 33/788 |
| 4,936,150 | 6/1990 | Burke et al. | 33/788 |

FOREIGN PATENT DOCUMENTS 2168498 6/1986 United Kingdom ............. 73/862.49

Primary Examiner—Robert Raevis
Attorney, Agent, or Firm—Pearne, Gordon, McCoy & Granger

[57] ABSTRACT

Apparatus for measuring axial bending or tensile stresses on a rod (1).

A ring (10) carries at least one sensor or transducer (15). A ring (11), parallel to the ring (10), serves as a magnetic target. The rings are formed by two substantially semicircular, dismantlable halves. The measurement consists of estimating the width of the gap (12) between the rings (10 and 11). The sensors (15) can be of the magnetic reluctance type.

Application to the measurement of stresses in sliding rods of certain safety taps, cocks or valves.

5 Claims, 3 Drawing Sheets

APPARATUS FOR MEASURING AXIAL STRESSES ON A ROD

DESCRIPTION

The invention relates to an apparatus for measuring axial tensile or compressive stresses on a rod.

A possible application for such an apparatus is the measurement of operating stresses in the control rod of certain taps, cocks or valves. The known apparatuses make it possible to measure said stress directly by the elongation or contraction of the rod or by means of an operating torque at the output of the servomotor controlling the rod. Certain of these apparatuses are too fragile to be used under all the possible operating conditions, particularly under high temperature, irradiation or in the presence of shocks. Others make it necessary to dismantle certain parts of the valve, which is incompatible with a measurement during normal operation. There are other apparatuses which make it possible to measure the stresses via a parameter such as the displacement of flexible washers of a stress limiter. It is also possible to use resistant sensors requiring no dismantling of the parts, but the accuracy obtained with such an indirect procedure is inadequate.

The fundamental aim of the invention is to directly measure the axial stresses in the rod by means of a robust apparatus and which requires no dismantling of parts of the valve. It is also essential that said apparatus can easily be fitted and dismantled, which is not the case with the strain gauge systems used at present for such measurements in other technical fields.

In its most general form, the apparatus comprises two rings, each formed by two sectors assembled to one another in a dismantlable manner and fixed to the rod by an internal contact surface, at least one contact-free distance measuring sensor fixed to one of the rings and a measuring means making it possible to measure the distance between the sensor and the other ring. The distance measuring sensor is materially separate from the other ring, so that no stress is transmitted between the rings, which therefore remain in place on the rod constituting their sole connecting means.

Preference is given to using two diametrically opposite sensors on the rings in order to avoid the measuring errors produced by parasitic bending stresses on the rod. A greater facility of use is offered if the sensors fitted to a ring are fixed to the same ring sector, which implies that the sectors of the rings have unequal dimensions.

The envisaged construction uses magnetic sensors, which emit a field, which closes on a magnetic target. More specifically, a sensor comprises a ferrite block containing an excited coil, as well as another magnetic measuring coil and emits a field on a target constituted by a facing magnetic part.

The reliability of the measurements is also increased if the rings have an internal collar bearing on the rod, preferably on a part remote to the other ring, so as to obtain a better sensitivity.

Finally, the apparatus can have a fitting part which is provided, like a sector of each of the rings, with dismantlable, mutual connection means and mutual positioning means. This guarantees that the rings will be placed at a uniform distance from one another at the time of installation.

Figure 2:
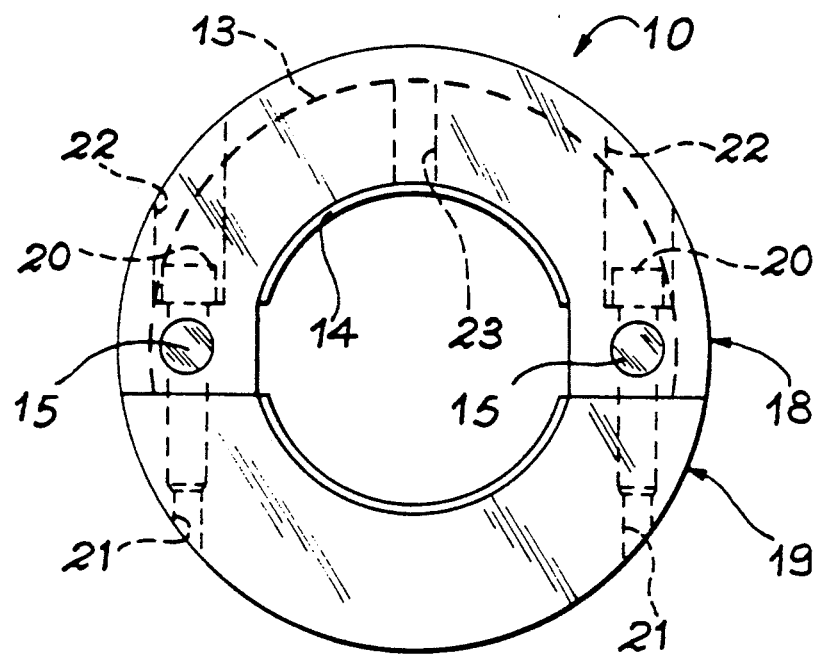
Figure 3:
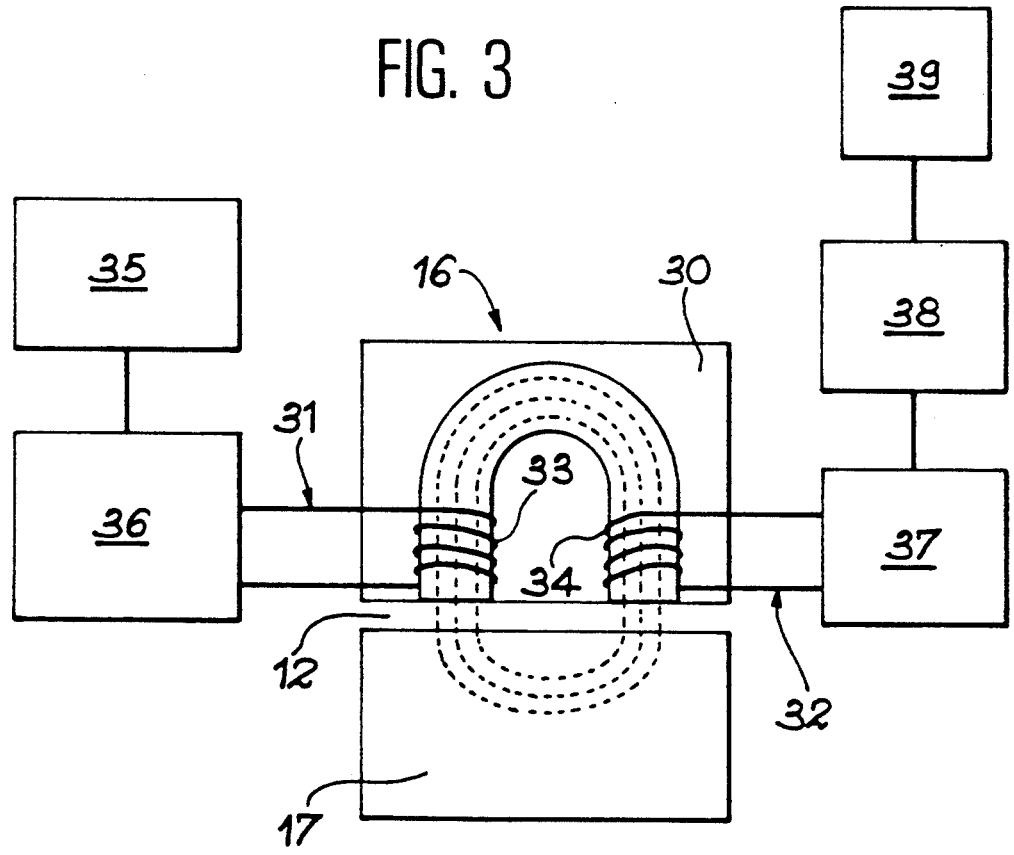
Figure 4:
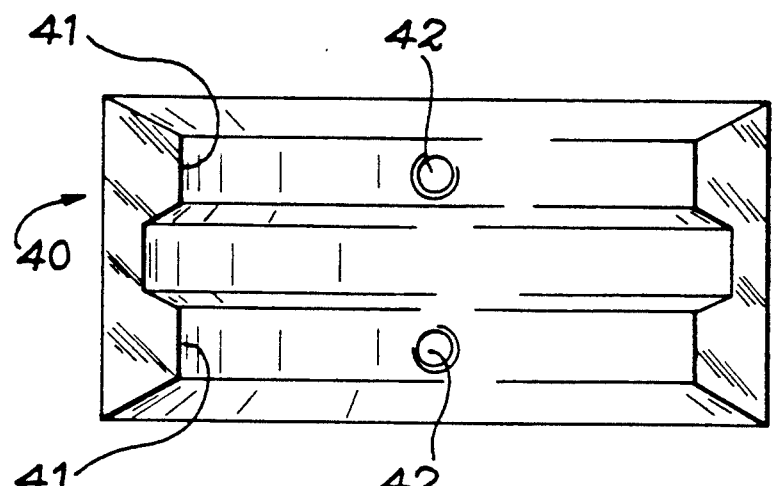
Figure 5:
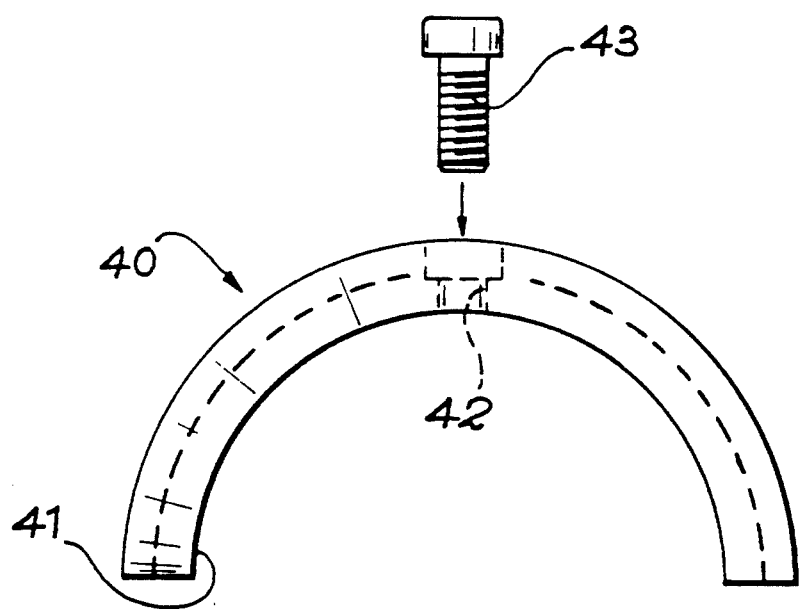

The invention is described in greater detail hereinafter relative to non-limitative embodiments and with reference to the attached drawings, wherein show:

FIG. 1 a view of the apparatus in the fitted state, in a diametral section of the rod.
FIG. 2 a view from below of the upper ring.
FIG. 3 the sensors used in detail.
FIG. 4 a radial view of the fitting part.
FIG. 5 a plan view of said part.

Measurement takes place of the axial stresses on a rod 1, which in the envisaged application belongs to a valve and which controls a blanking cap 2 fixed to one of its ends. The control is brought about by a servomotor 3 at the other end of the rod 1. It is a question of periodically checking that the servomotor 3 can subject the rod 1 to adequate axial stresses to be able to displace the blanking cap 2, particularly against friction and the pressure forces of the fluid, whose flow is modified by the blanking cap 2. In such equipment, there is normally a gap between a frame containing a packing gland 4 beyond which the blanking cap 2 is located, and a holding arch 5 beyond which is located the servomotor 3. The rod 1 is exposed in said gap and it is here that said apparatus is installed.

The apparatus comprises an upper ring 10 separated from a lower ring 11 by a gap 12. Except for a few details, the rings 10 and 11 are alike and are arranged symmetrically on either side of the gap 12. Each of them has on its outer surface an indentation 13 with a trapezoidal cross-section and on its inner surface a locking collar or clamp 14 on a random portion of the rod 1, which is perfectly smooth. The collar 14 of each ring 10 or 11 is positioned remotely to the other ring 11 or 10, so that the length of the rod 1 bounded by the collars 14 and whose elongation is measured is as large as possible. It is also useful for the height of the collars 14 to be reduced, so as to prevent any sliding during the elongation or contraction of the rod 1. However, it is necessary to avoid the marking of the latter by excessive contact pressures. This is why it is possible to recommend a height slightly less than 1 mm for the collars 14.

The apparatus is provided with two identical sensors 15, each of which is fitted to the upper ring 10. If the material forming the lower ring 11 is not magnetic, a magnetic material target is fitted to the said ring. Each sensor 15 is located in front of the gap 12 and faces the corresponding target 17.

FIG. 2 only shows the upper ring 10, the latter being constituted by two unequal sectors 18 and 19. The largest sector, called the support sector 18, extends over slightly more than a half-circumference and carries the two sensors 15, which consequently remain diametrically opposite with respect to the rod 1 with a good level of accuracy, even in the case of an imperfect assembly of the two ring sectors 18 and 19. This assembly is brought about by two screws 20. For this purpose, the smallest sector or clamping sector 19 has two parallel, tangential taps 21 on either side of the internal collar 14 and the support sector 18 is provided with two spot faced bores 22, which face the taps 21 on installation. The screws 20 are then introduced into the said bores 22 and screwed into the taps 21 until the screw heads abut against the bottom of the spot faces. Use is advantageously made of so-called captive screws, which have an unthreaded portion with a thinner cross-section just below the heads 20. The bores 22 have a few threads at the location to be reached by the unthreaded portions in the installed position. When the two sectors 18 and 19 are not assembled, the crest of the threads of the screws 20, at the limit of the thinnest cross-section, abut on the few threads of the bores 22, which prevents the screws 20 from being withdrawn from the support sector 18 unless they are unscrewed, which is not possible except when the action is deliberate. The support sector 18 also has a central, radial tap 23 at mid-height, whose function will be explained hereinafter. The lower ring 11 is identical, except for the ferromagnetic target 17 which it carries.

A description will now be given of the sensors 15 using FIG. 3. The lower parts 17 are small ferromagnetic blocks constituting a target. The sensors 15 are more complex, because in addition to a ferrite pot or block 30, they have a primary circuit 31 and a secondary circuit 32. Each of the circuits 31 is formed by a wire wound into a coil 33 or 34 inserted in the pot 30. The primary circuit 31 is connected to an oscillator 35 and to a voltage-current converter 36. The secondary circuit 32 is connected to an amplifier, a band-pass filter 37, a demodulator 38 and a low-pass filter 39. The coil 33 of the primary circuit 31 brings about a magnetic field in the ferrite pot 30, whose lines close again in the ferromagnetic block to form loops. The characteristics of this field are dependent on the thickness of the gap and therefore the reluctance of the magnetic device and they are measured by the coil 34 of the secondary circuit 32 which is engaged therein.

If the amplitude of the supply current of the primary circuit 31 is constant, the output voltage of the secondary circuit 32 is dependent on the elongation of the rod 1, in accordance with a practically hyperbolic law. It is the electronic circuit constituted by the elements 37, 38 and 39, which linearizes and conditions the said voltage.

FIGS. 4 and 5 show a semicircular shell 40 used for fitting the apparatus. It has on its inner face two projections 41 having a trapezoidal cross-section and which penetrate the indentations 13 of the support sectors 18, as well as in its centre two radial perforations 42, which issue in the centre of the projections 41.

The installation of the apparatus on the rod 1 is preceded by a stage in which the support halves 18 of the two rings 10 and 11 are screwed onto the shell 40 with the aid of screws 43 engaged in the perforations 42 and the taps 23, so that the projections 41 penetrate the indentations 13 and consequently the support sectors 18 are locked.

This arrangement makes it possible to ensure the parallelism of the support sectors 18 with a well defined, invariable spacing. The assembly is then moved towards the rod 1 and engaged therewith until the internal collars 14 touch it. It is then possible to assemble the clamping sectors 19 in succession on the support sectors 18. The rings 10 and 11 are now firmly maintained on the rod 1 and it is possible to remove the shell 40 and start the measurements.

Other constructions of the apparatus are possible. It is in particular possible to envisage other than magnetic sensors, such as capacitive, optical, eddy current or ultrasonic sensors. Like inductive sensors, they make it possible to avoid any mechanical connection between the rings by a component carrying e.g. a strain gauge, which could be imprecise as a result of a poor fitting and could disturb the deformation of the assembly due to the asymmetry which it would introduce into the system.

The separate rings fixed to a smooth rod by the friction of an internal surface can be fitted and dismantled easily at different points of the rod in order to obtain the most appropriate measurement.

We claim:

1. Apparatus for measuring axial stresses on a rod having a diameter, said apparatus comprising:
   a first ring and a second ring, each ring composed of a support sector and a clamping sector mutually assembled in a dismantlable manner, said rings each having an internal contact surface for gripping said rod; and
   two sensors fixed to the support sector of said first ring at diametrically opposite locations, the sensors being contact-free sensors.

2. Apparatus according to claim 1, wherein said internal contact surface of each ring is composed of an internal collar located remotely from the other ring.

3. Apparatus according to claim 1, wherein the support sector and clamping sector of each ring is interconnected by screws, the screws having a longitudinal elasticity enabling the rings to grip the rod when said rod is elongated and contracts.

4. Apparatus according to claim 1, wherein said sensors are inductive sensors and said second ring includes two ferromagnetic blocks facing respective sensors, the blocks both being borne by the support sector of said second ring.

5. A stress measuring assembly for measuring axial stresses on a rod having a diameter, said assembly comprising:
   a stress measuring apparatus including:
      a first ring and a second ring, each ring composed of a support sector and a clamping sector mutually assembled in a dismantlable manner, said rings each having an internal contact surface for gripping said rod; and
      two sensors fixed to the support sector of said first ring at diametrically opposite locations, the sensors being contact-free sensors; and
   a single fitting part of substantially semicircular shape, said fitting part and said support sector of each ring being provided with dismantlable, mutual connecting means and mutual positioning means comprising circumferential projections and indentations of trapezoidal cross-section.

* * * * *